Patented Dec. 30, 1924.

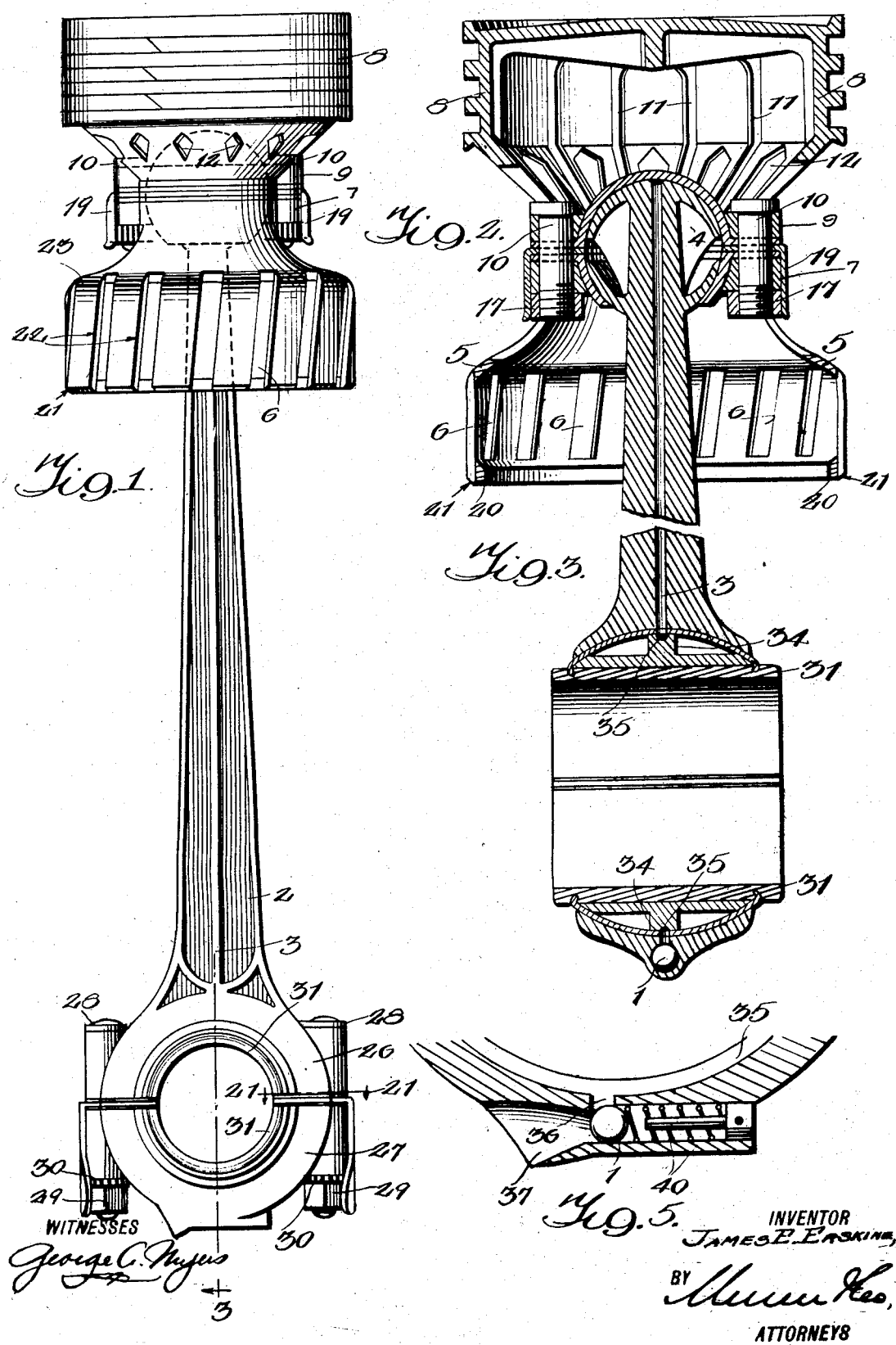

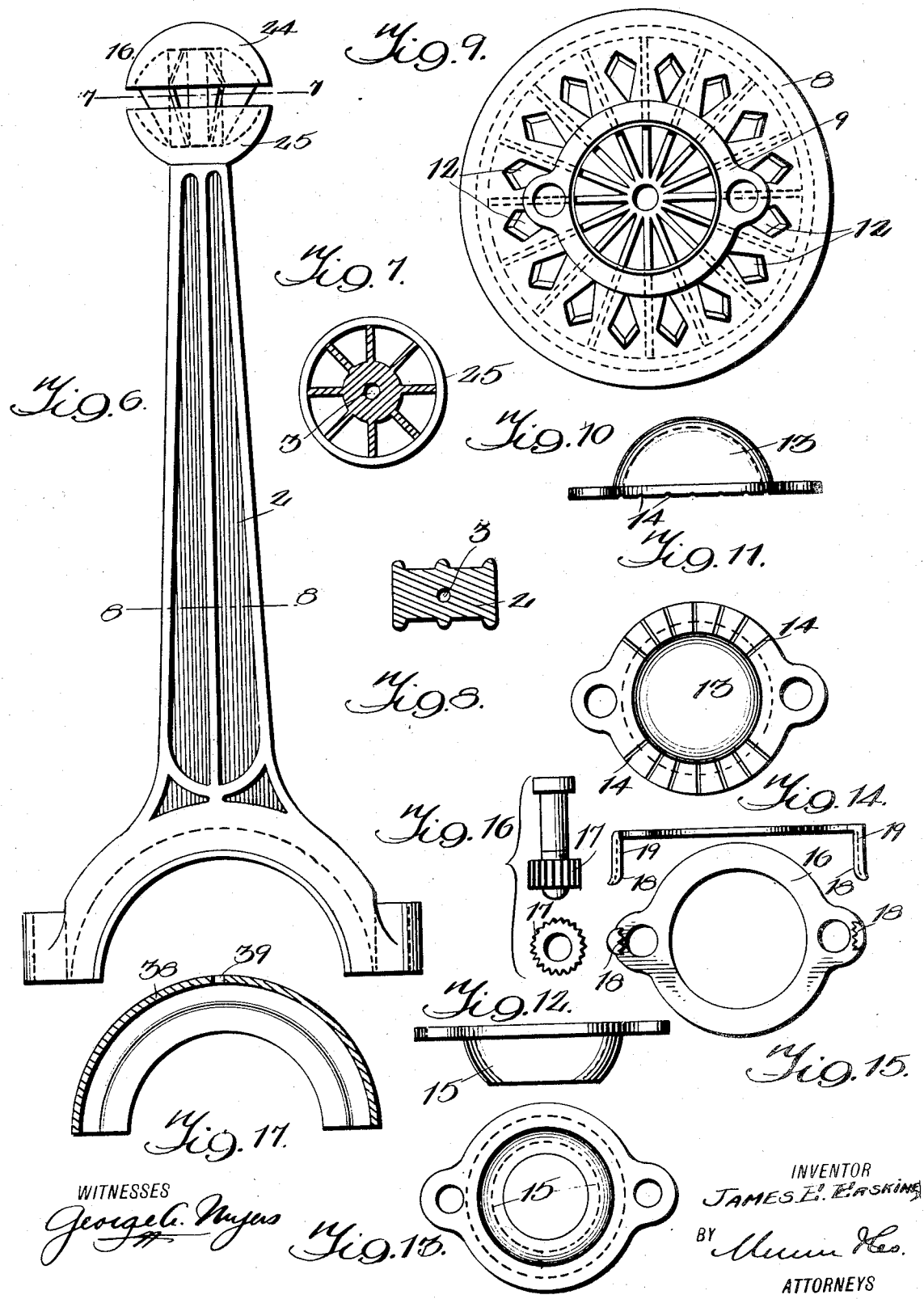

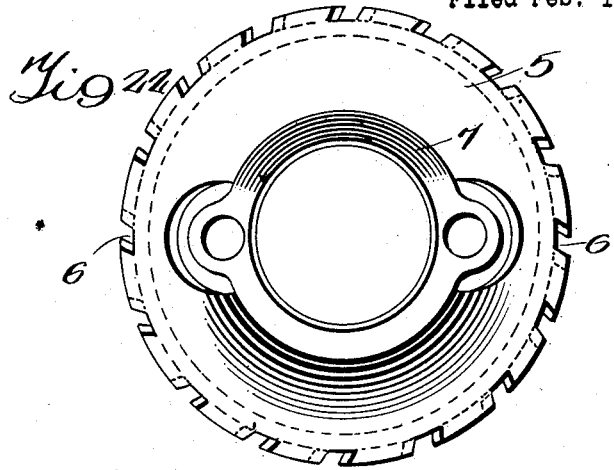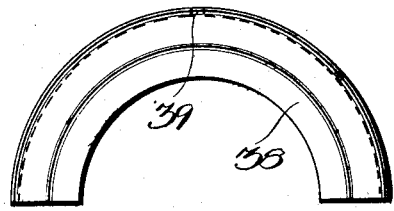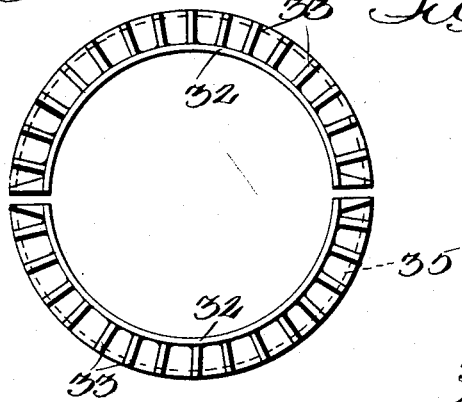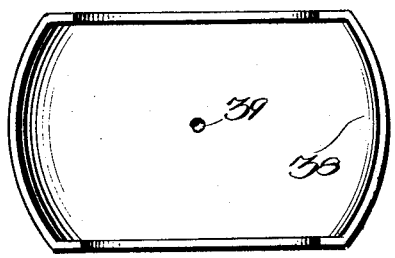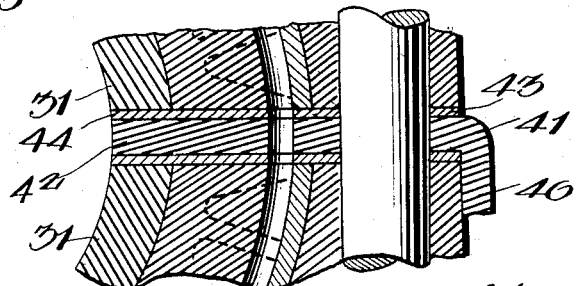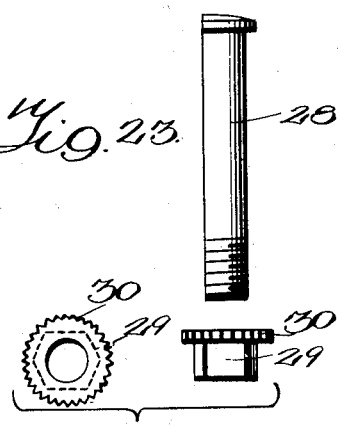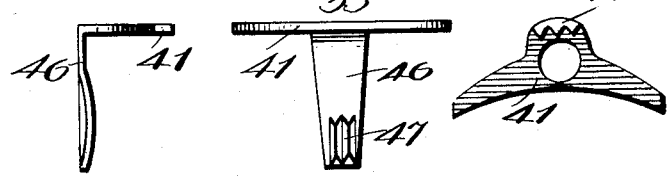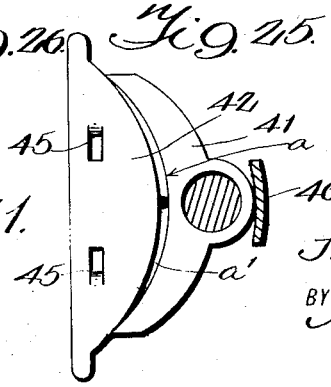

1,521,515

UNITED STATES PATENT OFFICE.

JAMES EDISON ERSKINE, OF JACKSONVILLE, FLORIDA.

PISTON AND CONNECTING-ROD CONSTRUCTION.

Application filed February 16, 1921. Serial No. 445,425.

*To all whom it may concern:*

Be it known that I, JAMES EDISON ERSKINE, a citizen of the United States, and a resident of Jacksonville, in the county of Duval and State of Florida, have invented certain new and useful Improvements in Pistons and Connecting-Rod Constructions, of which the following is a specification.

My invention relates to improvements in internal combustion engines, it being more particularly an improvement in pistons and connecting rods therefore, and it consists in the constructions, combinations and mode of operation herein described and claimed.

One of the foremost objects of the invention is to provide an improved piston and connecting rod, each being indispensable to the other and both cooperating to produce an efficient lubrication of the piston as it reciprocates.

Another object of the invention is to provide a piston which rotates with a step-motion in respect to the connecting rod, each time a stroke is made, thereby avoiding wearing the piston into an oval or other distorted shape, scoring longitudinal channels in the cylinder wall, or furthering other objectionable features, this motion of the piston being the result of the action of the piston against the oil, which former is peculiarly shaped for this purpose.

A further object of the invention is to provide a force-feed lubricating system for the connecting rod and piston of an engine, each being of a peculiar construction as is required for their mutual cooperation to effect that result.

A further object of the invention is to provide a connecting rod and piston embodying a lubricating system such as defined, the connecting rod including an oil reservoir in the ball joint on which the piston is mounted and has rotational motion in turn produced in short steps by a certain resistant action of the piston against the same oil after it has been distributed along the cylinder wall.

Other objects and advantages will appear in the following specification, reference being had to the accompanying drawings, in which:—

Figure 1 is an assembly view illustrating the general construction of the improved piston and connecting rod, Figure 2 is a detail section of the piston, Figure 3 is a vertical section on the line 3—3 of Figure 1, showing the construction of the crank pin connection, Figure 4 is a detail section of the right side of the crank pin connection, illustrating the arrangement of the shims more particularly described below, Figure 5 is a detail section of the oil inlet valve, Figure 6 is a detail view of the upper part of the connecting rod, Figure 7 is a section on the line 7—7 of Figure 6, Figure 8 is a detail cross section on the line 8—8 of Figure 6, Figure 9 is an inverted plan view of the upper half of the piston, Figure 10 is a side elevation of the oil exhaust cap which fits on the upper hemisphere of the connecting rod ball, Figure 11 is an elevation of the oil exhaust cap, Figure 12 is a side elevation of the bottom cap, Figure 13 is a plan view thereof, Figure 14 is a side elevation of the combined shim and nut lock between the two caps.

Figure 15 is an inverted plan view thereof,

Figure 16 is a view showing one of the bolts and nuts for securing the piston halves together, in detail, Figure 17 is a detail section of the upper rib cover, Figure 18 is an inverted plan view of the same cover, Figure 19 is a side elevation of the lower rib cover, Figure 20 is a side elevation of the two halves of the babbitt holder, Figure 21 is a detail horizontal section on the line 21—21 of Figure 1, Figure 22 is a plan view of the lower piston half, Figures 23 and 24 are detail views of the securing bolts and nuts for the crank pin connection, Figure 25 is a side view of the lock shim in that connection, Figures 26 and 27 are respectively a side elevation and inverted plan view of that lock shim.

The general construction, is well shown in Figures 1 and 2, both the piston and connecting rod embodying peculiar features, which, although characterizing them as individual parts, really contribute to make the one indispensable to the other in the ultimate operation. A forced lubrication is maintained through all parts of the connecting rod and piston likely to wear. A charge of oil is admitted by the valve 1 at each circular sweep of the connecting rod 2, being carried up the bore 3 into the ball 4 from whence it spreads out in substantially all radial directions, flowing down over the lower half 5 to lubricate the piston as it reciprocates in the cylinder. The oil finally finds its way back to the crank case where it is again scooped up for a repetition of the preceding circulation.

In addition to lubricating the piston, the oil is instrumental in producing the function of turning the piston a short step at each stroke. For this purpose the lower half 5 has oil slots 6, cut at a slight pitch or bias. It is the resistance of the oil in these slots, that causes the piston to make step movements in a circle, approximately a distance equal to the pitch of the slots, at each outward stroke. The purpose of causing the piston to rotate is to effectively distribute the oil, and prevent scoring of the cylinder walls or wearing the piston unevenly. In order that the two main elements may be considered separately, attention is first directed to the piston head, the lower half 5 of which has already been introduced. It is made in two halves; the lower half 5 having a flange 7, the upper half 8 having a flange 9, the two being fastened together by bolts 10. Both halves are made of semi-steel or in fact any other suitable material, the upper half being ribbed at 11 and apertured at 12, respectively for the purposes of strength and lightness.

The central opening, defined by the flange 9 (in Figures 9 and 2 for example) accommodates the oil exhaust cap 13, the circular flange of which has radial grooves 14 underneath. It is through these grooves that the oil is distributed in substantially all radial directions, so as to flow down over the lower half 5 as stated above. The companion or bottom cap 15 is made plain, the two when fitted together providing a socket for the ball head 16 of the connecting rod 2.

A combined shim and nut lock 16 is fitted between the flanges of the two caps. Figure 15 shows it to appear much like a washer. The nuts 17 of the bolts 10 are axially serrated or kurled either in whole or in part on the outside so that the correspondingly serrated parts 18 of the spring fingers 19 may fit in and hold the nuts to whatever position they are turned into. It is a simple matter to turn the nuts in respect to the spring fingers, with the proper wrench.

In casting the lower half 5 a rib 20 is formed on the inside. The outer edge is chamfered or undercut at 21 for the purpose of eliminating the otherwise sharp edge and facilitating the approach of the piston on the film of oil. The rib 20 makes up in strength for that which would otherwise be lost by the machining of the slot 6. As stated before these are cut on a bias as clearly shown in Figure 1.

It is the resistance of the oil in the slots that causes the step-motion of the piston in a circular direction. This may occur on either the inward or outward strokes, possibly occurring more freely on the suction strokes because then the resistance on the bearings is less than on the other strokes. The action of these slots is like this: The walls or edges 22 cut the oil on the down stroke but the adjacent portions 23 of the piston being rounded prevent the oil from working up into the cylinder above the piston, so that there is little likelihood of excess carbon forming. Attention is now directed to the construction of the connecting rod 2, which, as stated before, has a bore 3 running up the middle and discharging on top of the upper hemisphere 24 of the ball head 16. The oil runs down from the point of discharge, to where it is distributed at the radial grooves 14 in the flange of the cap 13. But some of the oil will collect (and it is so intended) in the lower hemisphere 25, so that there is a constant supply not only for the radial grooves but also for the lubrication of the ball head in its bottom cap 15.

The crank pin bearing or connection is of necessity made in two parts: the upper part 26, which is a part of the rod 2, and the lower part 27 which is fastened in place like a cap. Bolts 28 are employed for that purpose. They are secured by nuts 29, which are knurled or serrated at 30 either in whole or in part. Coming next to the crank pin (not shown) are the babbitt inserts 31.

Next to these are the halves 32 of the babbitt holder. These are made of cast aluminum, and in being cast are formed with ribs 33 which support the annular bridge 34, provided with an oil groove 35, in turn annular so as to provide a path up on each side from the inlet valve 1. A small port 36 (shown in Figure 5) provides communication between the oil scoop 37 and the annular groove 35.

The covering shells 38 completely cover the groove 35, besides covering the ribs and all outermost parts of the holder 32 with the exception of one place at the top where the outlet aperture 39 occurs, and this must be provided so as to establish communication between the annular groove and the bore 3 of the connecting rod. The reader can readily follow the action. As the crank pin connection comes around each time, the scoop 37 gathers a little oil which displaces the ball 1 against the tension of its spring 40, admitting it to the groove 35, up which it passes, to the circulating system above.

In order to hold the babbitts 31 in place and to make an altogether firm construction, the edges of the shells 38 are set or forced into the soft substance of the babbitts as shown in Figure 3. In order that the crank pin connection may be made just right, an arrangement of shims is provided in addition to the central lock shim 41. Figure 4 illustrates the details described below. This lock shim is made on a semi-circle but its arc $a$ is struck on a lesser radius than the arc $a'$ of the radial or filling shim 42.

When these two are fitted together we get the result shown in Figure 21. The extremities of the shim 41 meet the radial shim 42, and the product is a crescent-shaped chamber in which a certain amount of oil collects before passing up into continuation of the groove 35. Both shims 41 and 42 are relatively thick when compared with the shims 43 and 44, the latter being stamped from metal approximately .002 of an inch thick. As many of these shims as may be required are applied above and below the shims 41 and 42.

Tangs 45 are stamped from the radial shims 42 for the purpose of holding the thin shims beneath in place, although these tangs might be dispensed with. The lock shim 41 has a central depending finger 46 which, like the finger 19 of the shim 16, has a toothed part 47 for the purpose of engaging the knurled rim 30 of the nut 29 so as to hold it in place. Figure 23 shows one side of the head of the bolt 28 cut away so as to fit flush against the adjacent part of the connection 26.

While the construction and arrangement of the improved piston and connecting rod as herein described and claimed, is that of a generally preferred form, obviously modifications and changes may be made without departing from the spirit of the invention or the scope of the claims.

I claim:—

1. A piston and connecting rod, having a universal joint between the two, the piston having surface slots; instrumentalities for forcing a lubricant to the joint to all parts of which it is applied, and means for radially distributing some of the lubricant to the surface of the piston for coaction with the slots to produce circular step motions of the piston on the joint during reciprocation.

2. A piston having a surface slotted skirt, a connecting rod having a ball head and an oil bore provided with a valved inlet near the crank pin connection and an outlet at said ball head on which the piston is universally movable; and means incorporated in the connection between the piston and ball head for radially distributing the oil forced thereto, to both lubricate the piston and provide an element which exerts the resistance against parts of the slots to produce rotational step motion of the piston on its joint.

3. A piston composed of a plurality of parts, caps embodied in each, one with radial grooves for the distribution of oil; a connecting rod having a ball head occupying the socket produced by the caps when fitted together and a bore, the ball head being hollow but braced to form a reservoir for oil discharged at the top from said bore in the connecting rod, and means for securing the piston parts and caps together around the ball head.

4. A piston composed of upper and lower halves each with an open space, semi-circular flanged caps fitted in the spaces the flange of one being grooved for the distribution of oil the summit of the other being cut away; a connecting rod extending through the cut cap, having a ball head occupying the socket produced by both caps, the connecting rod having an oil bore discharging at the top for lubricating the moving parts and entering the radial grooves, and means for securing the piston halves and caps together.

5. A piston composed of two halves each with a circular opening, semi-circular caps in the openings with flanges engaging adjacent abuttable surfaces, a connecting rod with a ball head fitting the socket produced by the caps when fitted together, means for securing the parts together, and a combined shim and lock disposed between the cap flanges, with parts engaging portions of the locking means.

6. A piston composed of two halves, each with an inserted cap producing a socket when the parts are fitted together; a connecting rod with a ball head occupying the socket and constituting a universal joint, bolts and nuts securing the halves and caps around the ball head, and a shim between the caps with depending roughened spring fingers for engaging like parts of the nuts.

7. A piston, a crank pin connection including two covering shells, a connecting rod a ball head at the top and an oil bore extending from said ball head to a port of the upper one of two covering shells in the crank pin connection, babbitt holders inside the shells, each with ribbed bridge pieces with grooves defining an annular oil groove; babbitt inserts held against the holders by clinched parts of the shells, and a valved scoop in communication with the annular groove for introducing charges of oil.

8. A piston and connecting rod having a crank pin connection said rod having a universal connection to the piston and provided with an oil bore running therefrom to an opening in the crank pin connection at the bottom; babbitt holders, babbitt inserts and covering shells embraced by said connection, the shells and parts of the holders defining an annular oil groove, with a valved inlet scoop at the bottom; and means defining oil pockets at the meeting places of the groove where parts of the connection join, including radial and lock shims, the latter with means for engaging securing means of said connection parts.

9. A piston and connecting rod having a universal joint uniting the two, said piston having a medial constriction in which the universal joint is situated and having slots cut through the skirt on a bias downwardly from said constriction so as to impact an oil film on the wall of a cylinder during reciprocation and thus cause the piston to rotate on the rod, and a circumferential rib on the skirt to compensate for the structural strength lost by cutting said slots.

10. A piston and connecting rod having a universal joint uniting the two said piston having a constriction substantially dividing it into an upper head and a lower skirt, the lower skirt having slots cut through on a bias to in turn cut a film of oil on a cylinder wall during reciprocation and force it to the inside of the piston, the upper part of the skirt being rounded to prevent oil working up the cylinder wall past the head.

11. A piston comprising a piston head, a bearing chamber included in the head having oil outlets, a connecting rod having a corresponding bearing member occupying the chamber and having an oil bore terminating at said bearing member, and means included in said bearing member which defines a pocket to receive some of the oil over the edge of which pocket the oil overflows upon angling of the connecting rod during reciprocation of the piston to reach said oil outlets.

12. A piston comprising a piston head having a spherical bearing chamber with oil outlets, and a connecting rod having a hollow spherical head operable in said chamber and a bore to deliver oil to the bearing surfaces, said head being divided to produce upper and lower hemispheres of which the lower forms a reservoir over the edge of which the oil spills in the angling of the connecting rod to supply said oil outlets.

13. A piston and connecting rod, and joint-forming means between the two comprising an element in the piston constituting a socket and an element carried by the connecting rod arranged to move in the socket, said element including a formation defining a trough for oil over the edge of which said oil is adapted to flow to lubricate the bearing surfaces.

14. A piston and connecting rod, means in the piston constituting the receiving element of a bearing, and means on the connecting rod constituting vent elements adapted to fit in the receiving element, said means including a hood-like structure and a trough-like structure over which oil is respectively adapted to flow and in which the oil is adapted to accumulate.

JAMES EDISON ERSKINE.